US012469332B2

(12) United States Patent
Dagan

(10) Patent No.: US 12,469,332 B2
(45) Date of Patent: Nov. 11, 2025

(54) TECHNIQUES FOR PERFORMING AND UTILIZING FREQUENCY SIGNATURE MAPPING

(71) Applicant: The Joan and Irwin Jacobs Technion-Cornell Institute, New York, NY (US)

(72) Inventor: Morann Sonia Dagan, Hempstead, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 401 days.

(21) Appl. No.: 18/146,867

(22) Filed: Dec. 27, 2022

(65) Prior Publication Data

US 2023/0206695 A1 Jun. 29, 2023

Related U.S. Application Data

(60) Provisional application No. 63/266,071, filed on Dec. 28, 2021.

(51) Int. Cl.
*G06V 40/20* (2022.01)
*G01S 17/89* (2020.01)
*G06V 10/764* (2022.01)

(52) U.S. Cl.
CPC .............. *G06V 40/20* (2022.01); *G01S 17/89* (2013.01); *G06V 10/764* (2022.01)

(58) Field of Classification Search
CPC ...... G06V 40/20; G06V 10/764; G01S 17/89; G01S 17/66
See application file for complete search history.

(56) References Cited

U.S. PATENT DOCUMENTS

| 5,396,729 A | 3/1995 | Vejvoda |
| 6,882,279 B2 | 4/2005 | Shuman et al. |

(Continued)

FOREIGN PATENT DOCUMENTS

| CA | 2915458 C | 8/2017 |
| CN | 102143683 B | 4/2015 |

(Continued)

OTHER PUBLICATIONS

International Search Report for PCT/IB2022/062816, dated Apr. 20, 2023. International Bureau of WIPO.

(Continued)

*Primary Examiner* — Iriana Cruz
(74) *Attorney, Agent, or Firm* — M&B IP Analysts, LLC

(57) ABSTRACT

Systems and methods for mitigating moving targets using frequency signature mapping. A method includes mapping a plurality of electronic signatures of a target to a three-dimensional (3D) model into an electronic signature mapping, wherein the 3D model includes 3D features representing a plurality of historical frequency signatures; classifying a movement behavior of the target into at least one classification based on the electronic signature mapping and a plurality of learned behaviors for respective classifications of historical movement behavior; and performing at least (Continued)

one mitigation action to interfere with the classified behavior, wherein the at least one mitigation action is determined based on the at least one classification.

23 Claims, 5 Drawing Sheets

(56) References Cited

U.S. PATENT DOCUMENTS

| | | |
|---|---|---|
| 7,401,436 B2 | 7/2008 | Chyun |
| 8,957,730 B2 | 2/2015 | Lozhkin |
| 9,645,377 B2 | 5/2017 | Bosworth et al. |
| 9,664,813 B2 | 5/2017 | Janet et al. |
| 9,894,852 B2 | 2/2018 | Gilbert et al. |
| 10,281,570 B2 | 5/2019 | Parker et al. |
| 10,549,430 B2 | 2/2020 | Nakata et al. |
| 10,650,588 B2 | 5/2020 | Hazeghi et al. |
| 11,010,910 B2 | 5/2021 | Harmsen et al. |
| 11,032,494 B2 | 6/2021 | Tsia et al. |
| 2010/0184563 A1 | 7/2010 | Molyneux et al. |
| 2016/0245907 A1* | 8/2016 | Parker ............... H04K 3/45 |
| 2017/0031013 A1* | 2/2017 | Halbert ............... G01S 7/414 |
| 2017/0202200 A1 | 7/2017 | Hortel et al. |
| 2017/0273290 A1 | 9/2017 | Jay |
| 2019/0179016 A1* | 6/2019 | Raring ............... H01S 5/4087 |
| 2021/0041548 A1 | 2/2021 | Chen et al. |
| 2021/0258328 A1* | 8/2021 | Appel ............... H04L 67/12 |
| 2022/0060489 A1* | 2/2022 | Moore ............... H04L 63/1425 |
| 2022/0163667 A1* | 5/2022 | Maleki ............... H01S 5/142 |

FOREIGN PATENT DOCUMENTS

| | | |
|---|---|---|
| CN | 103281896 B | 1/2016 |
| CN | 113298023 A | 8/2021 |
| EP | 0573559 B1 | 9/1996 |
| EP | 2441047 A1 | 4/2012 |
| EP | 3756018 A1 | 12/2020 |
| EP | 3345131 B1 | 4/2021 |
| JP | 5149183 B2 | 2/2013 |
| JP | 2015006204 A | 1/2015 |
| JP | 2019517049 A | 6/2019 |
| JP | 6615218 B2 | 12/2019 |
| RU | 2555438 C2 | 7/2015 |

OTHER PUBLICATIONS

Written Opinion of the Searching Authority for PCT/IB2022/062816, dated Apr. 20, 2023. International Bureau of WIPO.

* cited by examiner

TECHNIQUES FOR PERFORMING AND UTILIZING FREQUENCY SIGNATURE MAPPING

CROSS-REFERENCE TO RELATED APPLICATIONS

This application claims the benefit of U.S. Provisional Patent Application No. 63/266,071 filed on Dec. 28, 2021, the contents of which are hereby incorporated by reference.

TECHNICAL FIELD

The present disclosure relates generally to tracking movement of three-dimensional objects in space, and more specifically to using frequency signature mapping to track and mitigate movement of three-dimensional objects.

BACKGROUND

Tracking movements of targets such as bees, other insects, or other small creatures can be an important tool in the agricultural context. Specifically, activity of local insects can have a significant impact on crop development, and the presence of pests long term can damage or otherwise impede development of crops. Some insects, such as honeybees, have a positive effect on crop development by spreading pollen. However, other types of insects, including other bees, may cause damage to crops. For example, masonry bees may remove leaves by cutting away sections. This can cause major harm to foliage when too many leaves are removed, which in turn can harm long term development of the plant.

In addition to certain types of insects which can be harmful, insects having certain diseases can harm crop production indirectly by spreading those diseases among a colony or other group of insects. For example, bees typically live in crowded colonies with frequent physical contact, which can cause parasites and pathogens to be readily transmitted between bees. A bee with an infectious disease may spread the disease to other bees in the colony, leading to many other bees dying of the disease. This, in turn, can reduce or even eliminate the bee population in an area. Consequently, development of crops which rely on bees for pollination in that area may be impeded by the depletion of the bee population.

Given the foregoing, monitoring behavior of insects such as bees allows for evaluating potential effects on crops which might be caused by such insects. Some existing solutions allow for tracking movements of small objects such as insects, but have disadvantages with respect to the quality of equipment needed to accurately track small moving objects. Thus, solutions which allow for monitoring insects or other small objects with less expensive equipment and solutions which improve the accuracy of monitoring movement are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for mitigating moving targets using frequency signature mapping. The method comprises: mapping a plurality of electronic signatures of a target to a three-dimensional (3D) model into an electronic signature mapping, wherein the 3D model includes 3D features representing a plurality of historical frequency signatures; classifying a movement behavior of the target into at least one classification based on the electronic signature mapping and a plurality of learned behaviors for respective classifications of historical movement behavior; and performing at least one mitigation action to interfere with the classified behavior, wherein the at least one mitigation action is determined based on the at least one classification.

Certain embodiments disclosed herein also include a non-transitory computer readable medium having stored thereon causing a processing circuitry to execute a process, the process comprising: mapping a plurality of electronic signatures of a target to a three-dimensional (3D) model into an electronic signature mapping, wherein the 3D model includes 3D features representing a plurality of historical frequency signatures; classifying a movement behavior of the target into at least one classification based on the electronic signature mapping and a plurality of learned behaviors for respective classifications of historical movement behavior; and performing at least one mitigation action to interfere with the classified behavior, wherein the at least one mitigation action is determined based on the at least one classification.

Certain embodiments disclosed herein also include a system for mitigating moving targets using frequency signature mapping. The system comprises: a processing circuitry; and a memory, the memory containing instructions that, when executed by the processing circuitry, configure the system to: map a plurality of electronic signatures of a target to a three-dimensional (3D) model into an electronic signature mapping, wherein the 3D model includes 3D features representing a plurality of historical frequency signatures; classify a movement behavior of the target into at least one classification based on the electronic signature mapping and a plurality of learned behaviors for respective classifications of historical movement behavior; and perform at least one mitigation action to interfere with the classified behavior, wherein the at least one mitigation action is determined based on the at least one classification.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
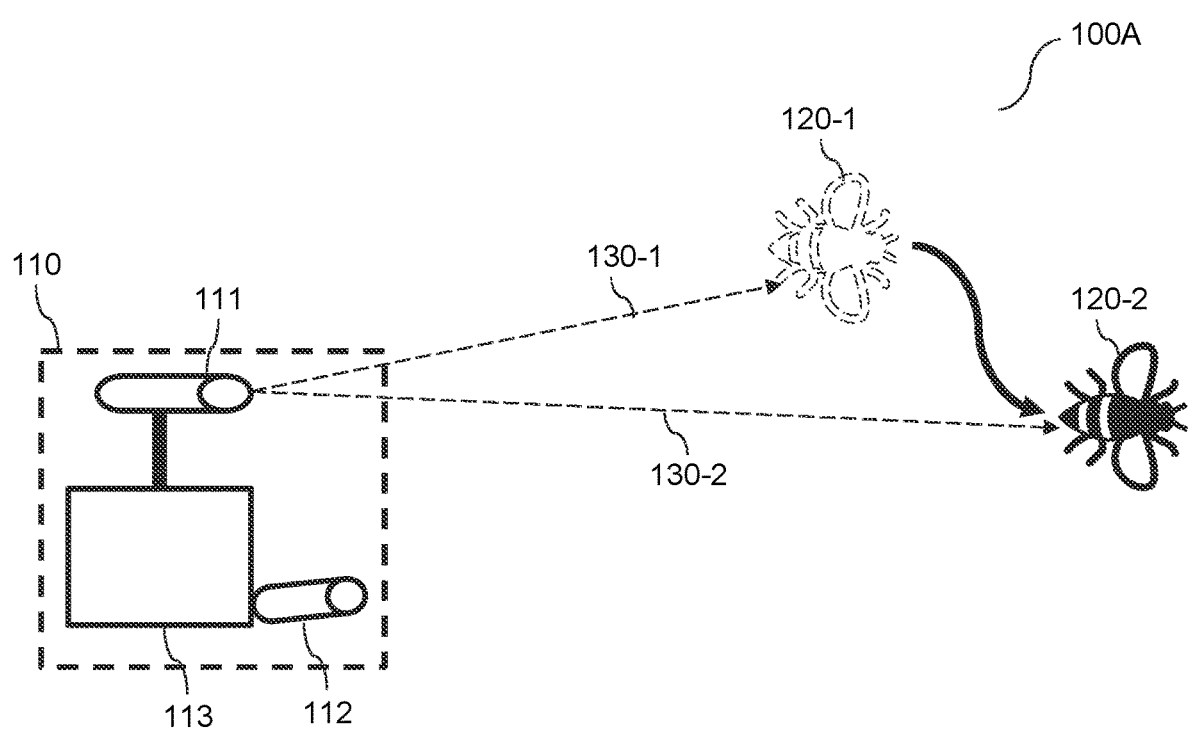
FIG. 1A is an example illustration demonstrating monitoring target behavior in accordance with various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for monitoring and mitigating behavior of moving targets. In an embodiment, electronic signatures of a target are mapped to a three-dimensional (3D) model. Based on the mapping and learned behaviors for different classifications of historical target behavior, behavior of the current target is classified. Based on the classification, one or more mitigation actions may be performed in order to neutralize the target or otherwise to interfere with the classified behavior.

In a further embodiment, the mapped electronic signatures are determined based on frequency samples captured using Lidar or other reflection-based techniques. To this end, a sampling rate of a digitizer assembly for capturing the signals (e.g., a digitizer) is set. Specifically, the sampling rate is set such that it is not equal to or a multiple of a repetition rate of a laser used to emit pulses. A maximum amount of time for obtaining overlapping reflected signals of pulses for light directed at the target is determined based at least on the speed at which the target is moving. The sampling rate, the repetition rate, or both, may be adjusted to ensure this maximum amount of time is achieved. Pulses of light or other radiation are applied using techniques such as Lidar. While the pulses are being applied, a area of interest of a scanning algorithm used to capture signals from reflected pulses is adjusted based on the speed of the target, the direction of movement of the target, and changes in direction of movement of the target. Adjusting the area of interest of the scanning algorithm further includes determining a revisit rate based on the speed of the target.

In this regard, it has been identified that certain movement behaviors can be associated with unhealthy targets as compared to healthy targets, with friendly targets or unfriendly targets (e.g., with respect to crops such that friendly targets are unlikely to harm crops while unfriendly targets are more likely to harm crops) or with targets having different roles within a group (e.g., a leader of a swarm may display different movement behaviors than a member of the swarm), and such behaviors may therefore be utilized to classify targets based on their movements in 3D space. These behaviors can be learned by monitoring movements of historical targets in 3D space and comparing known movement behavior patterns of different categories of historical targets to movements of a current target, for example, by comparing a mapping of frequency signatures demonstrating movement of the current target to the known movement behavior patterns.

Thus, for example, unhealthy targets may be neutralized using the disclosed embodiments in order to remove those targets from a broader colony or other group (e.g., a colony of bees), thereby reducing spread of disease among the colony or other grouping. This, in turn, can improve crop development in areas with insects or other targets which provide benefits to crops. Similarly, unfriendly targets may be mitigated using the disclosed embodiments in order to reduce harm to crops that is likely to be caused by those unfriendly targets. Moreover, targets having certain roles within a group (e.g., a leader of a swarm) may be mitigated in order to disrupt potentially harmful activity by the group. As a non-limiting example, a leader of a swarm may be neutralized in order to interfere with navigation by the swarm toward certain crops. Moreover, the disclosed embodiments may be utilized to improve scanning for other types of targets such as, but not limited to, aerial vehicles (e.g., drones), birds, and the like.

It has also been identified that use of digitizers with lower maximum sampling rates may be highly desirable for cost purposes (since such digitizers tend to be less expensive than digitizers with higher sampling rates), but that existing solutions cannot effectively track movement of targets using digitizers with lower maximum sampling rates particularly when the targets are small and moving. It has further been identified that adjusting pulse application with respect to sampling rate, pulse generation, and area of interest used for scanning allows for maintaining accuracy of readings even when using lower maximum sampling rate digitizers. Accordingly, the disclosed embodiments include techniques for improved frequency sampling which allows for improving accuracy while monitoring movements of moving targets, thereby allowing for effective tracking of moving targets even when using lower maximum sampling rate digitizers.

FIG. 1A is an example illustration 100A demonstrating monitoring target behavior in accordance with various disclosed embodiments. As shown in FIG. 1A, a frequency signature monitoring and mitigation assembly 110 is deployed in an area where a target such as an insect is moving between locations such as locations 120-1 and 120-2.

Specifically, the mitigation assembly 110 depicted in FIG. 1A includes a digitizer assembly 111 projecting laser beams 130-1 and 130-2 in order to capture data about positions of the targets in three-dimensional space, for example using light detection and ranging (Lidar) techniques. Specifically, the digitizer assembly 111 includes a laser and a receiver (laser and receiver not depicted individually in FIG. 1A), where the laser is configured to project the laser beams 130-1 and 130-2, and the receiver is configured to capture signals from the laser beams 130 after the laser beams 130 reflect off of surfaces. The readings from the receiver are input to a digitizer (also not shown) for processing.

The mitigation assembly 110 further includes a mitigation laser 112 configured to project laser beams (the laser beams projected by the mitigation laser 112 are not shown in FIG. 1A) to harm or otherwise mitigate insects identified as pests based on movement behavior as described herein. The mitigation assembly 110 also includes a frequency signature monitor 113 configured to map frequency signatures and classify behavior of insects as described herein. An example schematic diagram of the frequency signature monitor 113 is described further below with respect to FIG. 4.

In an embodiment, frequency samples captured by the digitizer assembly 111 are mapped and utilized to classify behavior of insects as described herein. The classification and mapping may be utilized to mitigate insects demonstrating certain behaviors, as a non-limiting example, behaviors associated with pests or other problematic insects. Such mitigation may include, but is not limited to, projecting a laser beam at the insect via the laser 112 in order to interrupt movement of the insect or otherwise to stop the potentially problematic behavior.

In a further embodiment, the frequency signature monitor 113 may configure the digitizer assembly 111 to sample frequencies using the frequency sampling process described below with respect to FIG. 3. Specifically, the sampling rate of the pulse projected by the digitizer assembly 111 is set such that it is not a multiple of the repetition rate of that pulse, a maximum time for overlapping pulses is determined based on movement of the insect, and a area of interest of the scanning algorithm of the digitizer assembly 111 is adjusted in real-time to account for movement of the target. As noted above, adjusting the pulse and scanning algorithm configurations allows for improving accuracy of monitoring movement of the target in 3D space, particularly when the digitizer assembly 111 has a lower sampling rate. Thus, this configuration adjustment allows for effective monitoring 3D movements of small targets using a less expensive digitizer as compared to existing solutions.

Figure 1B:
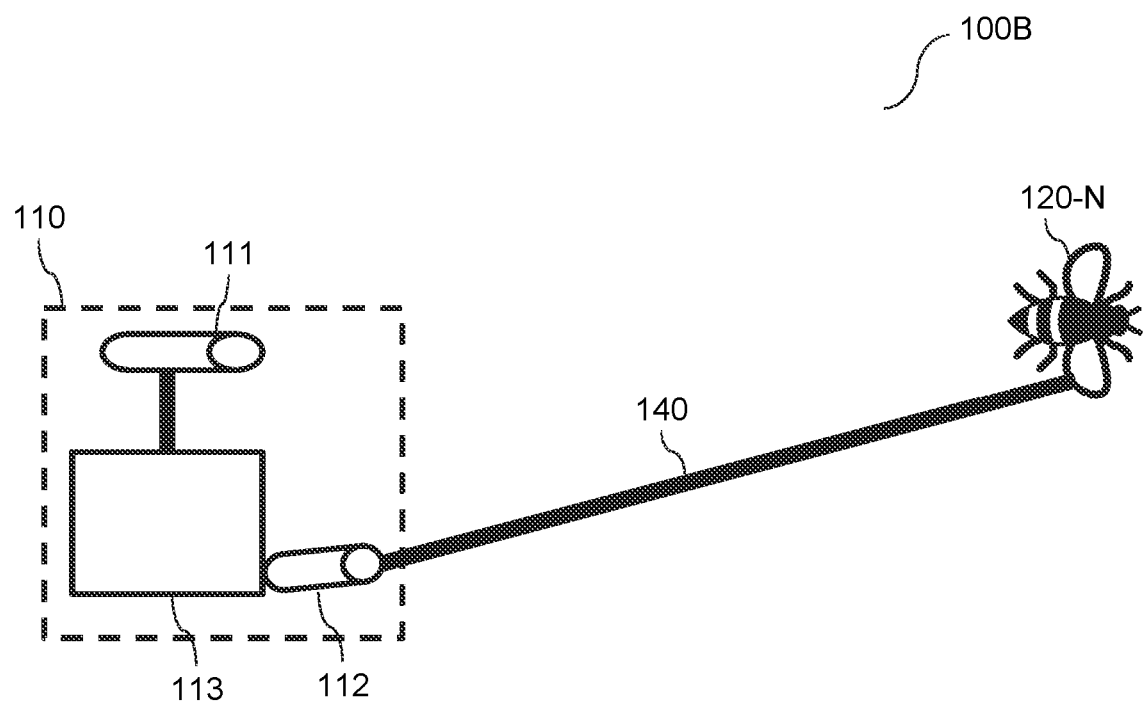
FIG. 1B is an example illustration demonstrating mitigation of a target in accordance with various disclosed embodiments.

FIG. 1B is an example illustration 100B demonstrating mitigation of a target in accordance with various disclosed embodiments. As depicted in FIG. 1B, behavior of the insect now at location 120-N (where N is an integer greater than or equal to 2) may be mitigated by projecting a laser beam 140 via the laser 112. The laser beam 140 disrupts movement of the insect or otherwise interferes with the behavior of the insect, thereby mitigating the behavior. As a non-limiting example, a particular body part of the insect such as the wings may be targeted with the laser 140.

It should be noted that FIGS. 1A and 1B depict the digitizer assembly 111 and the laser 112 used for mitigation as discrete components, but that a single laser component may be utilized in some implementations. For example, a laser of the digitizer assembly 111 may be reconfigured when mitigation actions are needed to modify the output of the laser in order to allow, for example, damaging the insect or a portion thereof only during mitigation. In various other implementations, the maximum output of the laser used by the digitizer assembly 111 may be limited such that a separate laser 112 is used to perform mitigation.

It should also be noted that the frequency signature monitor 113 may include or be integrated in any other components of the assembly 110 without departing from the scope of the disclosure. Additionally, the frequency signature monitor 113 may be deployed remotely (for example, by communicating with the digitizer assembly 111 and the laser 112 via one or more networks, not shown) without departing from the scope of the disclosure.

Figure 2:
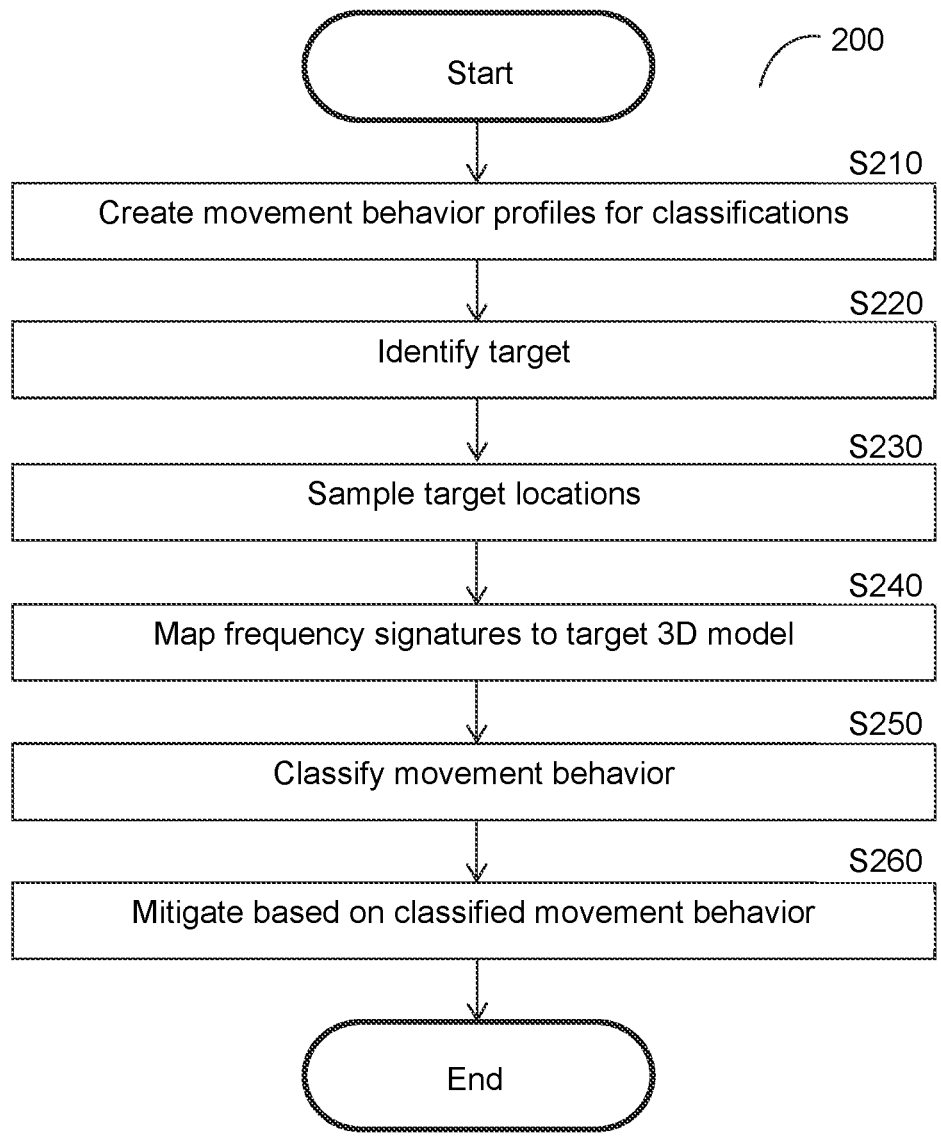
FIG. 2 is a flowchart illustrating a method for mitigating target behavior using frequency mapping according to an embodiment.

FIG. 2 is a flowchart 200 illustrating a method for mitigating target behavior using frequency mapping according to an embodiment. In an embodiment, the method is performed by the frequency signature monitor 113, FIGS. 1A-B.

At S210, movement behavior profiles are created for different classifications of target behavior (e.g., different types of insect behavior). The created movement behavior profiles may be, but are not limited to, mappings of historical frequency signatures in 3D space. As a non-limiting example, the historical frequency signatures may be mapped to a layered historical 3D model such that the model includes both 3D features representing locations within the historical 3D model as well as corresponding historical frequency signatures for different locations within the historical 3D model.

In an embodiment, S210 includes performing one or more tests using different test scenario conditions in order to study different categories of targets. Each such test includes monitoring movements of each target in order to learn movement behavior patterns for the target. Those movement behavior patterns may be aggregated for different targets of the same classification. As a non-limiting example, such categories may include friendly and unfriendly, healthy and unhealthy, member of a swarm and leader of a swarm, combinations thereof, and the like. Further, the categories may correspond to different types of targets (e.g., categories may include healthy bees and unhealthy bees in addition to or instead of healthy flies and unhealthy flies).

In a further embodiment, historical behaviors of targets known to be in the same category may be clustered, and clustered behaviors may be aggregated into one or more aggregated behavior profiles representing different known movement behaviors associated with the given category. In this regard, it is noted that individual targets may move slightly differently while in the same category (e.g., unhealthy) such that clustering and aggregating behavior from targets in the same category may allow for providing more accurate overall representations of behavioral patterns with respect to movement.

At S220, a target to be classified is identified within a 3D space. In an embodiment, S220 includes identifying movement based on results of scanning within the 3D space. In a further embodiment, the target is identified when one or more target identification conditions are met. To this end, S220 may include applying one or more target identification rules defined with respect to the target identification conditions.

In yet a further embodiment, the target identification conditions require detecting a signal-to-noise ratio (SNR) of at least 10 and at least 3 signal peaks within a field of view of a digitizer assembly.

In this regard, it has been identified that, to identify a target for which behavior can be meaningfully classified, movements of the target must occur within view of the digitizer assembly in a manner that allows for effective sampling. Moreover, it has been identified through experimentation that a SNR of at least 10 in combination with identification of at least 3 signal peaks within 1½ scanning periods are optimal minimum conditions for identifying appropriate targets which ensures appropriate targets are identified as rapidly as possible while maintaining accuracy of subsequent processing.

At S230, locations of the target in 3D space are sampled in order to obtain frequency signatures at multiple locations within the 3D space. The sampling is performed by taking samples using a 3D scanning technique such as, but not limited to, light detection and ranging (Lidar). In an embodiment, each frequency signature is a frequency value or band of frequency values reflecting signals captured by a receiver (e.g., the receiver of the digitizer assembly 111, FIGS. 1A-B).

Figure 3:
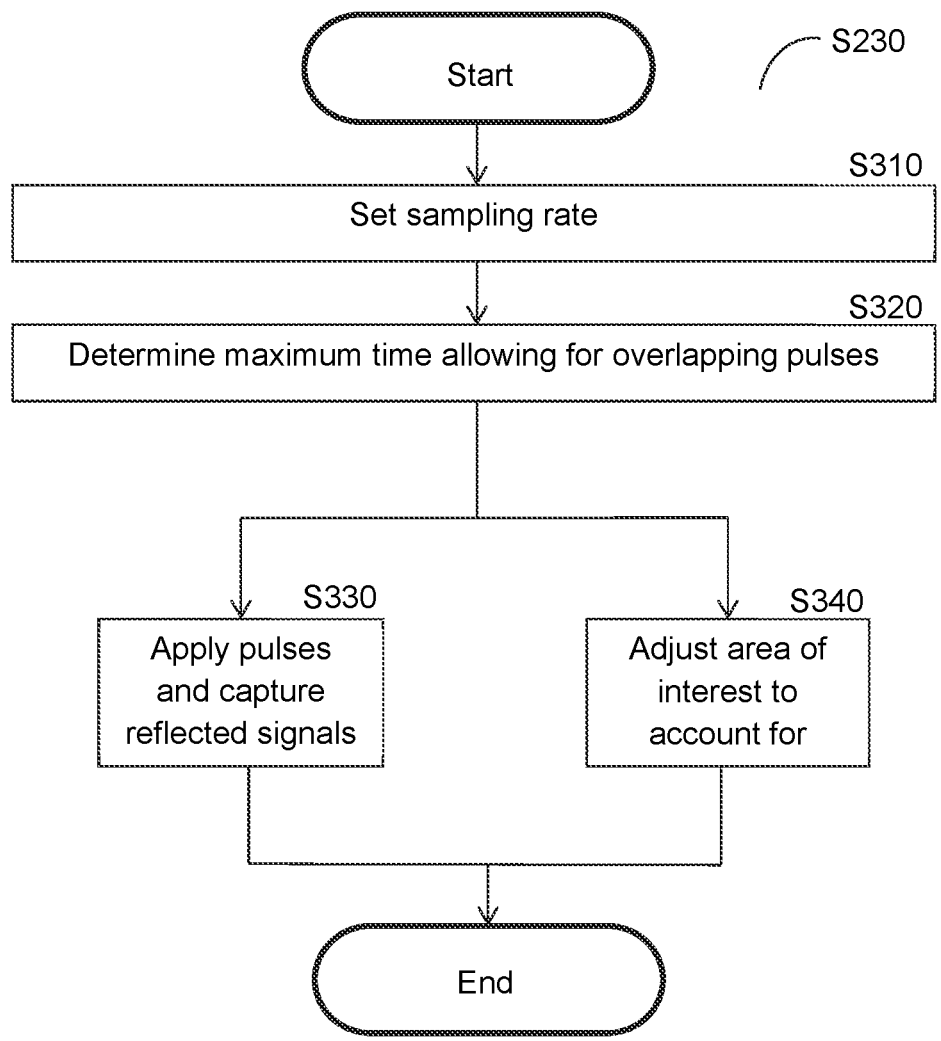
FIG. 3 is a flowchart illustrating a method for frequency sampling according to an embodiment.

In an embodiment, the sampling involves a frequency sampling process as described with respect to FIG. 3. FIG. 3 is a flowchart S230 illustrating a method for frequency sampling according to an embodiment. The method may be performed, for example, by the frequency signature monitor 113 or a digitizer assembly such as the digitizer assembly 111, FIGS. 1A-B. Such a digitizer assembly may include, but is not limited to, a receiver, a laser or other transmitter, and a digitizer that are collectively configured to perform Lidar techniques in order to obtain samples of locations of a target.

At S310, a sampling rate and a repetition rate of a digitizer assembly (e.g., the digitizer assembly 111) or other 3D laser scanner system are set. In an embodiment, the sampling rate is the average number of samples per unit of time captured by a receiver of the digitizer assembly and the repetition rate is an average number of pulses projected per unit of time by a laser or other transmitter of the digitizer assembly. In a further embodiment, the sampling rate and the repetition rate are set such that the sampling rate is not equal to or a multiple of the repetition rate. A multiple of the repetition rate is a number that is evenly divisible by the repetition rate and the sampling rate, i.e., such that there is no remainder when dividing the sampling rate by the repetition rate. In other words, the sampling rate and the repetition rate are set such that there is a remainder when the sampling rate is divided by the repetition rate (i.e., yields a nonzero remainder or, in other words, a remainder value other than zero). Setting the sampling rate such that it is not equal to or a multiple of the repetition rate ensures that different points of the target are obtained, which helps ensure that a sufficient number of samples are obtained in order to accurately monitor movement even when using digitizers with lower sampling rates.

At S320, a maximum time allowing for overlapping pulses (i.e., pulses emitted toward the target while the target is in the same location or, in other words, obtaining multiple samples before the target moves such that it is not hit by lasers targeted at a given location) is determined based at least on a speed of the target in order to adjust the sampling rate, the repetition rate, or both. In a further embodiment, the maximum time is determined based further on wing beat frequency in order to further improve the accuracy of the frequency sampling.

In an embodiment, in order to comply with the maximum time allowing for overlapping pulses, the sampling rate, the repetition rate, or both, is adjusted. Specifically, in a further embodiment, a minimum threshold for each of the sampling rate and the repetition rate may be predetermined such that, if the sampling rate or the repetition rate determined at S310 is below its respective threshold, the sampling rate or the repetition rate is adjusted to at least meet the threshold. The threshold may, in turn, be based on a predetermined frequency value (e.g., a known or assumed maximum frequency value for a particular type of target or otherwise for a particular use case.

As a non-limiting example for adjusting sampling or repetition rate based on a maximum time for overlapping pulses, when the samples are to be taken for an insect, the predetermined frequency value may be 2 KHz reflecting a known maximum wingbeat frequency previously observed for insects. In a further non-limiting example, the threshold for each of the sampling rate and the repetition rate may be twice the predetermined frequency value, or 4 KHz. In such an example, when the sampling rate determined at S310 is 3 KHz and the repetition rate determined at S310 is 5 KHz, the sampling rate may be adjusted to be 4 KHz.

At S330 and S340, pulses are applied while an area of interest of a scanning algorithm of the digitizer assembly may be adjusted to account for movement of the target. Specifically, pulses are applied and the area of interest of the scanning algorithm is adjusted in real-time such that the field of view effectively tracks the target's movements. Such an area of interest is in an area being scanned and, more specifically, an area where the digitizer assembly is focusing within the area being scanned (e.g., an area where a LIDAR scanner is scanning within a potential area which can be scanned at a current position and orientation of the LIDAR scanner). To this end, in an embodiment, the area of interest may be a subset of an entire area within view of the digitizer assembly given a current position and orientation of the digitizer assembly. Adjusting the area of interest of the scanning algorithm in real-time while pulses are being applied allows for capturing appropriate samples of the target's location even while using a lower sampling rate digitizer, particularly for larger targets such as drones and birds where the target may move out of a current area of interest quickly in a manner that makes it impractical to obtain accurate samples for a given location.

At S330, pulses are applied in accordance with the sampling rate and the determined maximum time for overlapping pulses. Reflected signals (i.e., including signals reflected off of the target) are obtained as samples using a scanning algorithm. The pulses may be light pulses such that the pulses will reflect off of objects they encounter during travel, and the signals of the reflected pulses may be captured, thereby obtaining samples which collectively demonstrate movement of the target over time. In an embodiment, when the application of pulses begins, a trigger is received by the digitizer in order to prompt the digitizer to begin capturing pulse signals.

At optional S340, while pulses are being applied, the area of interest of the scanning algorithm is adjusted in real-time (i.e., between pulses or otherwise while pulse application is occurring) in order to account for movement of the target. To this end, S340 further includes determining a direction of movement of the target at various times as well as estimating changes in direction of the target, for example, based on the samples captured up to this point. In other words, the movements of the target are taken into consideration in order to effectively determine how long to direct the scanning algorithm at each point in 3D space and, consequently, how many pulses to direct to any given point. The changes in direction of the target may be based on estimated changes in angle of the receiver conducting the scanning algorithm (e.g., a receiver of the digitizer assembly 111). The estimated changes in angle may be determined with respect to, for example, pan, tilt, or both.

Specifically, the area of interest of the scanning algorithm can be adjusted in order to account for movements of larger targets (e.g., birds, drones or other aerial vehicles, etc.) which might otherwise be impossible for lower performance digitizers to accurately measure due to, for example, those larger targets moving out of the area of interest of the digitizer assembly faster than smaller targets such as insects. To this end, in some embodiments, a supplemental detection system such as radar may be used to estimate a future position of a target based on radar readings and, based on the estimated future position of the target, S340 includes determining a change of angle that will redirect the digitizer assembly toward that estimated future position.

In an embodiment, S340 further includes determining a revisit rate at various times during pulse application based on a current speed of the target at each of those times (e.g., a speed determined based on a limited set of the most recent movements of the target, for example as demonstrated by the 3D mapping), and the area of interest of the scanning algorithm is adjusted based on the revisit rates. The revisit rate defines the amount of time needed to return to a starting point, i.e., the time between any two given shots at the same point or set of points in 3D space. Specifically, the revisit rate may be set such that multiple samples of the target are likely to be obtained (e.g., at least a predetermined threshold number of samples) given the current movement of the target.

Returning to FIG. 2, at S240, the frequency signatures are mapped to a target 3D model such that the target 3D model is a layered model including both 3D features representing locations within the target 3D model as well as corresponding historical frequency signatures for different locations within the target 3D model.

At S250, movement behavior of the target is classified based on the target 3D model including the mapped frequency signatures. In an embodiment, S240 includes comparing the target 3D model to each historical 3D model representing one of the behavior profiles, for example a model created as described with respect to S210. The classified behavior may be a known behavior associated with a historical 3D model that matches the target 3D model above a threshold. To this end, S240 may include generating a matching score between the target 3D model and each historical 3D model.

In a further embodiment, the movement behavior of the target may be further classified based on a classification of the target itself, of one or more parts of the target (e.g., body parts such as wings, abdomen, head, etc.), combinations thereof, and the like. Specifically, some historical 3D models may be associated with respective types of targets (e.g., types of insects or types of bees), and some historical 3D models may be associated with respective types of body parts (e.g., abdomens or abdomens of bees). It is noted that using a classification of the target or of portions of the target can allow for more accurate classification of the target's movement and reduced processing since historical 3D models associated with different types of insects or other targets can be ignored during processing.

In another embodiment, S250 further includes overlapping pulses and classifying the behavior based on the overlapped pulses. To this end, in a further embodiment, S250 includes overlapping sets of pulses, overlapping consecutive pulses, both, and the like. Each set of pulses that is overlapped with other sets of pulses may be, for example but not limited to, a set including pulses which collectively meet one or more cycle requirements. The cycle requirements may be defined with respect to a predetermined definition of a cycle, which may further depend on the target (e.g., different predetermined cycles may be defined for different types of targets such as insects, birds, particular species thereof, and the like). A cycle may be, for example, a period of time during which certain predetermined portions of the target (e.g., wings of an insect) begin at a starting position and move until those portions of the target return to the starting position. Overlapping the pulses may include, but is not limited to, combining pulses or sets of pulses into combination overlapped pulses.

Overlapping pulses or sets of pulses allows for filling in potential information gaps among the signals being used for classification, thereby improving the accuracy of classification. It has further been identified that overlapping consecutive pulses (i.e., pulses which occur consecutively after one another) can improve range resolution for the signals, thereby further improving classification.

At S260, one or more mitigation actions are performed based on the classified movement behavior. In an embodiment, S260 may include applying one or more mitigation rules based on the classification of the target's movement, the classification of the target, identified portions of the target, available equipment to be used for mitigation (e.g., lasers), combinations thereof, and the like. As a non-limiting example, a bee whose movement is classified as unhealthy may be mitigated by projecting a laser at the bee (e.g., at its wings) in order to neutralize it, thereby limiting exposure of the bee to other bees in the colony.

The mitigation rules may further define, for each potential classification of target movement behavior, whether that classification represents movement of a potentially harmful target or a benign target. As non-limiting examples, harmful classifications may be defined as unhealthy, unfriendly, or leader, while benign classifications may be defined as healthy, friendly, or member.

In some embodiments, S260 includes projecting a laser beam (e.g., the laser beam 140 projected by the mitigation laser 112, FIGS. 1A-B) to neutralize or otherwise interfere with movement of the target when the classification of movement is potentially harmful. However, other mitigation measures may be taken without departing from the scope of the disclosure. In some embodiments, S260 may include continuing to monitor movement of the target without neutralizing or interfering with the target's movement when the classification of movement is benign.

It should be noted that a single iteration of target behavior classification and mitigation is depicted in FIG. 2, but that multiple iterations may be performed, in series or in parallel, without departing from the scope of the disclosure.

Figure 4:
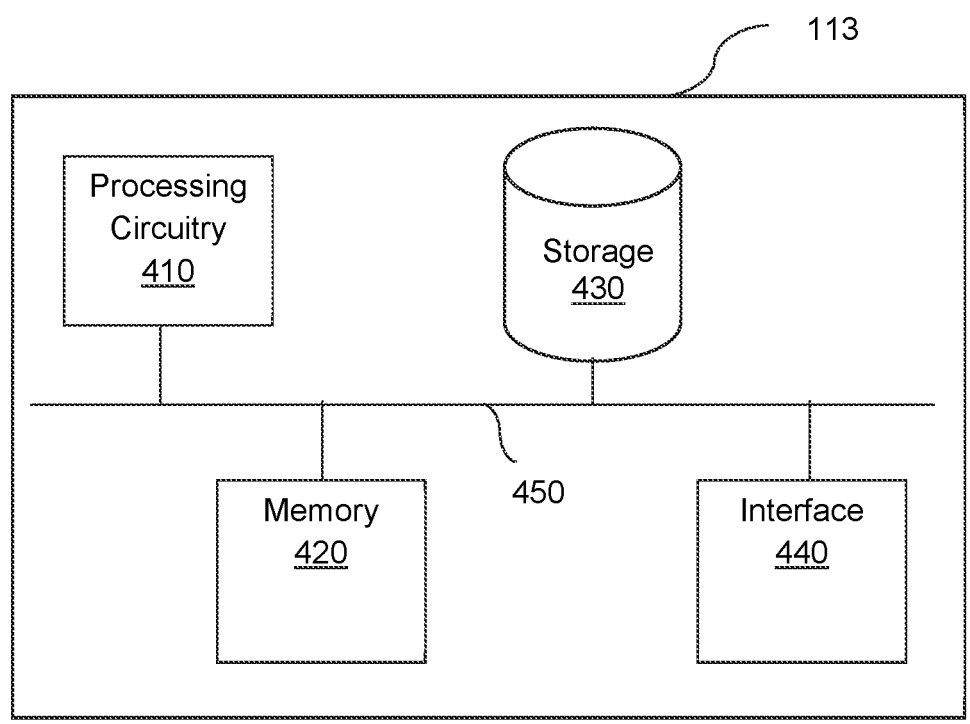
FIG. 4 is a schematic diagram of a frequency signature monitor according to an embodiment.

FIG. 4 is an example schematic diagram of a frequency signature monitor 130 according to an embodiment. Specifically, FIG. 4 depicts computing components used to realize various disclosed embodiments. The frequency signature monitor 130 includes a processing circuitry 410 coupled to a memory 420, a storage 430, and a network interface 440. In an embodiment, the components of the frequency signature monitor 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The interface 440 allows the frequency signature monitor 130 to communicate with, for example, the digitizer 111, the laser 112, or both, FIGS. 1A-B.

It should be understood that the embodiments described herein are not limited to the specific architecture illustrated in FIG. 4, and other architectures may be equally used without departing from the scope of the disclosed embodiments. Additionally, although FIG. 4 depicts computing components, other components which are not depicted may be part of or in communication with the frequency signature monitor 130 without departing from the scope of the disclosure. Such components may include, but are not limited to, a laser, a digitizer or other sensor, both, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating moving targets using frequency signature mapping, comprising:
    setting a sampling rate of a digitizer assembly to a value that yields a nonzero remainder when divided by a value of the repetition rate of the digitizer assembly, wherein the digitizer assembly has the sampling rate and a repetition rate;
    determining a maximum time for overlapping pulses based on a speed of a target;
    adjusting at least one of the sampling rate and the repetition rate based on the determined maximum time for overlapping pulses;
    determining a plurality of electronic signatures based on a plurality of frequency samples captured by the digitizer assembly with respect to the target;
    mapping the plurality of electronic signatures of the target to a three-dimensional (3D) model into an electronic signature mapping, wherein the 3D model includes 3D features representing a plurality of historical frequency signatures;
    classifying a movement behavior of the target into at least one classification based on the electronic signature mapping and a plurality of learned behaviors for respective classifications of historical movement behavior; and
    performing at least one mitigation action to interfere with the classified behavior, wherein the at least one mitigation action is determined based on the at least one classification.

2. The method of claim 1, wherein the maximum time for overlapping pulses is determined based further on a wing beat frequency of the target.

3. The method of claim 1, further comprising:
    applying a plurality of pulses via the digitizer assembly based on the sampling rate and the maximum time for overlapping pulses.

4. The method of claim 3, further comprising:
    adjusting, between pulses of the plurality of pulses, an area of interest of the digitizer assembly based on movement of the target.

5. The method of claim 4, further comprising:
    determining a direction of movement of the target at a plurality of times while the pulses are being applied; and
    estimating a change in the direction of movement of the target at the plurality of times while the pulses are being applied, wherein the area of interest of the digitizer assembly is adjusted based further on the direction of movement of the target and the estimated change in the direction of movement of the target at each time of the plurality of times while the pulses are being applied.

6. The method of claim 5, wherein estimating the changes in the direction of movement of the target further comprises:
    determining a revisit rate based on a current speed of the target at each time of the plurality of times while the pulses are being applied, wherein each revisit rate defines an amount of time to return to a starting point, wherein the area of interest of the digitizer assembly is adjusted based further on the revisit rate at each time of the plurality of times while the pulses are being applied.

7. The method of claim 3, further comprising:
    overlapping at least a portion of pulses among the plurality of pulses in order to create overlapped pulses, wherein the movement behavior of the target is classified based further on the overlapped pulses.

8. The method of 7, wherein the overlapped at least a portion of pulses includes at least one group of consecutive pulses, wherein each group of consecutive pulses is overlapped to create at least a portion of the overlapped pulses.

9. The method of claim 1, wherein the movement behavior of the target is classified based further on at least one of a classification of the target, and a classification of at least one body part of the target.

10. The method of claim 1, wherein performing the at least one mitigation action further comprises:
projecting a laser beam at the target.

11. The method of claim 1, further comprising:
identifying the target based on results of scanning within a space by applying at least one target identification rule, wherein the at least one target identification rule defines target identification conditions including detecting a signal-to-noise ratio of at least 10 and at least 3 signal peaks.

12. A non-transitory computer readable medium having stored thereon instructions for causing a processing circuitry to execute a process, the process comprising:
setting a sampling rate of a digitizer assembly to a value that yields a nonzero remainder when divided by a value of the repetition rate of the digitizer assembly, wherein the digitizer assembly has the sampling rate and a repetition rate;
determining a maximum time for overlapping pulses based on a speed of a target;
adjusting at least one of the sampling rate and the repetition rate based on the determined maximum time for overlapping pulses;
determining a plurality of electronic signatures based on a plurality of frequency samples captured by the digitizer assembly with respect to the target;
mapping the plurality of electronic signatures of the target to a three-dimensional (3D) model into an electronic signature mapping, wherein the 3D model includes 3D features representing a plurality of historical frequency signatures;
classifying a movement behavior of the target into at least one classification based on the electronic signature mapping and a plurality of learned behaviors for respective classifications of historical movement behavior; and
performing at least one mitigation action to interfere with the classified behavior, wherein the at least one mitigation action is determined based on the at least one classification.

13. A system for mitigating moving targets using frequency signature mapping, comprising:
a processing circuitry; and
a memory, the memory containing instructions that, when executed by the processing circuitry, configure the system to:
set a sampling rate of a digitizer assembly to a value that yields a nonzero remainder when divided by a value of the repetition rate of the digitizer assembly, wherein the digitizer assembly has the sampling rate and a repetition rate;
determine a maximum time for overlapping pulses based on a speed of a target;
adjust at least one of the sampling rate and the repetition rate based on the determined maximum time for overlapping pulses;
determine a plurality of electronic signatures based on a plurality of frequency samples captured by the digitizer assembly with respect to the target;
map the plurality of electronic signatures of the target to a three-dimensional (3D) model into an electronic signature mapping, wherein the 3D model includes 3D features representing a plurality of historical frequency signatures;
classify a movement behavior of the target into at least one classification based on the electronic signature mapping and a plurality of learned behaviors for respective classifications of historical movement behavior; and
perform at least one mitigation action to interfere with the classified behavior, wherein the at least one mitigation action is determined based on the at least one classification.

14. The system of claim 13, wherein the maximum time for overlapping pulses is determined based further on a wing beat frequency of the target.

15. The system of claim 13, wherein the system is further configured to:
apply a plurality of pulses via the digitizer assembly based on the sampling rate and the maximum time for overlapping pulses.

16. The system of claim 15, wherein the system is further configured to:
adjust, between pulses of the plurality of pulses, an area of interest of the digitizer assembly based on movement of the target.

17. The system of claim 16, wherein the system is further configured to:
determine a direction of movement of the target at a plurality of times while the pulses are being applied; and
estimate a change in the direction of movement of the target at the plurality of times while the pulses are being applied, wherein the area of interest of the digitizer assembly is adjusted based further on the direction of movement of the target and the estimated change in the direction of movement of the target at each time of the plurality of times while the pulses are being applied.

18. The system of claim 17, wherein the system is further configured to:
determine a revisit rate based on a current speed of the target at each time of the plurality of times while the pulses are being applied, wherein each revisit rate defines an amount of time to return to a starting point, wherein the area of interest of the digitizer assembly is adjusted based further on the revisit rate at each time of the plurality of times while the pulses are being applied.

19. The system of claim 15, wherein the system is further configured to:
overlap at least a portion of pulses among the plurality of pulses in order to create overlapped pulses, wherein the movement behavior of the target is classified based further on the overlapped pulses.

20. The system of 19, wherein the overlapped at least a portion of pulses includes at least one group of consecutive pulses, wherein each group of consecutive pulses is overlapped to create at least a portion of the overlapped pulses.

21. The system of claim 13, wherein the movement behavior of the target is classified based further on at least one of a classification of the target, and a classification of at least one body part of the target.

22. The system of claim 13, wherein the system is further configured to:
  project a laser beam at the target.

23. The system of claim 13, wherein the system is further configured to:
  identify the target based on results of scanning within a space by applying at least one target identification rule, wherein the at least one target identification rule defines target identification conditions including detecting a signal-to-noise ratio of at least 10 and at least 3 signal peaks.

* * * * *